May 14, 1963  H. J. GERBER  3,089,243
DATA READING APPARATUS
Filed May 27, 1959 4 Sheets-Sheet 1
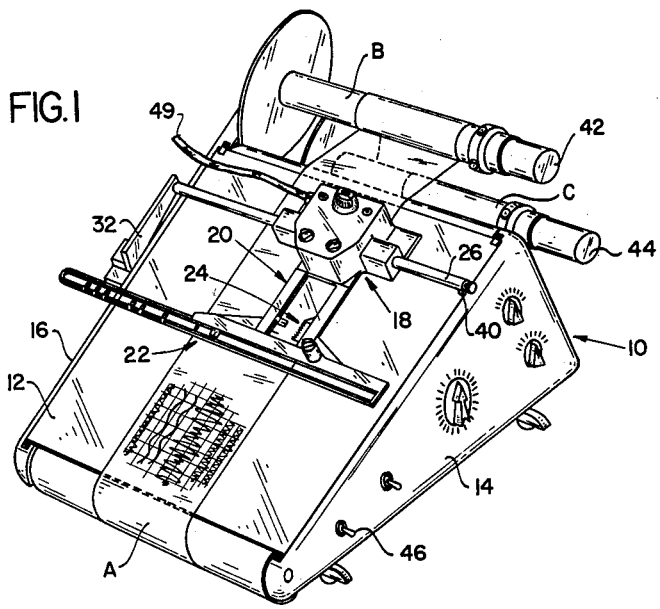
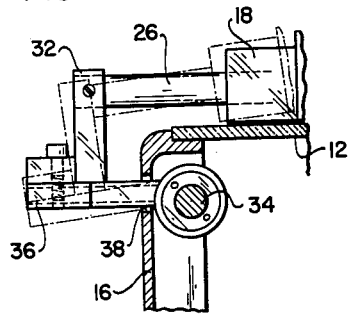
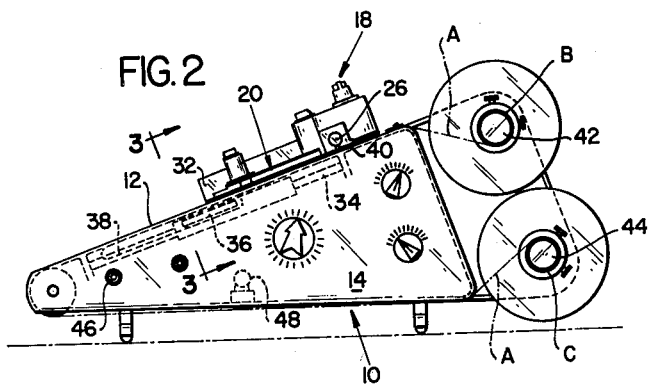
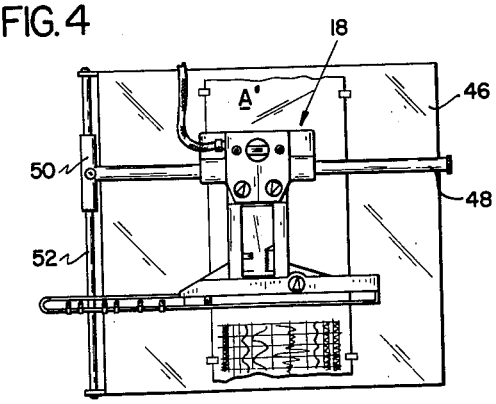
*INVENTOR.*
HEINZ JOSEPH GERBER
BY Teller & McCormick
ATTORNEYS

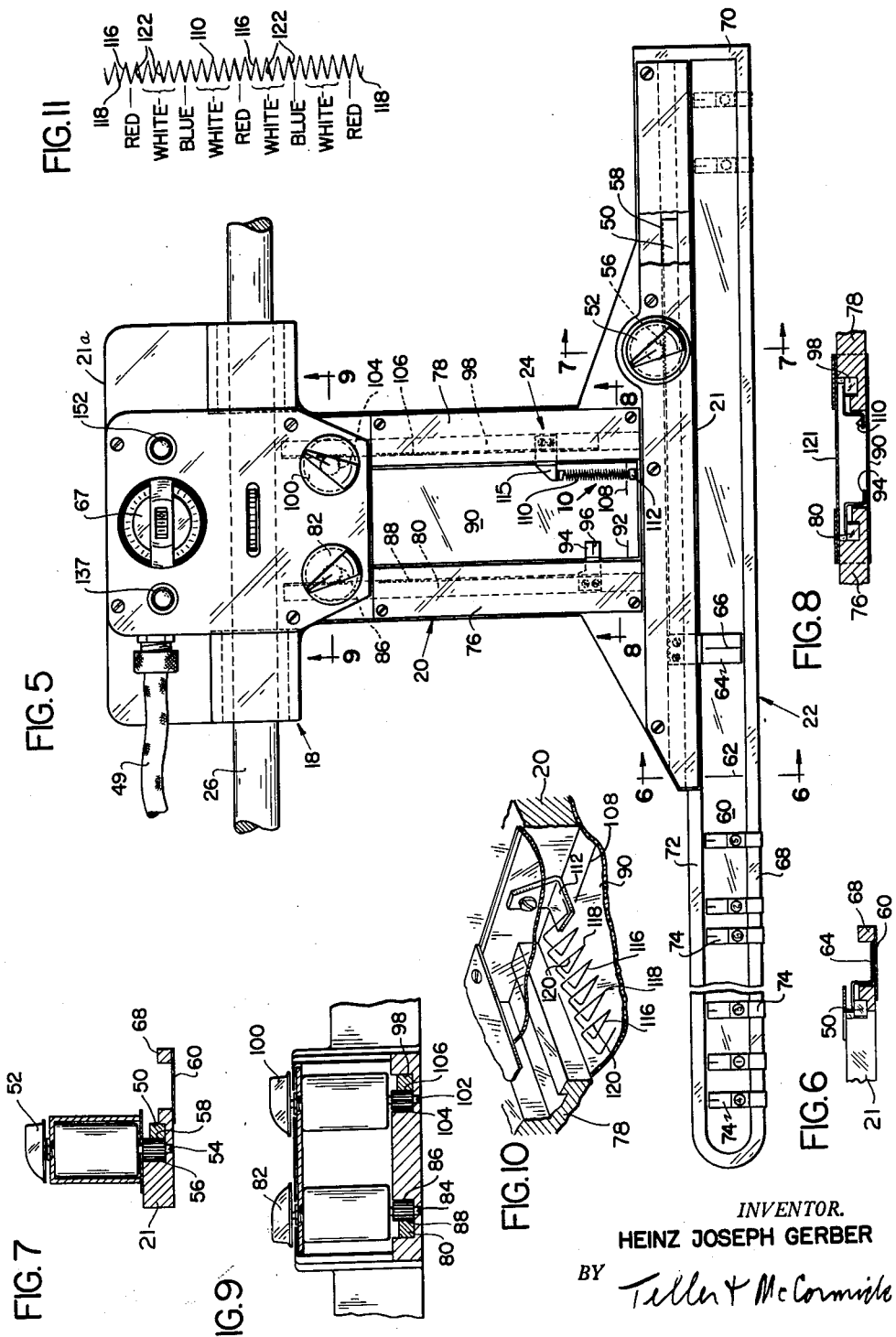

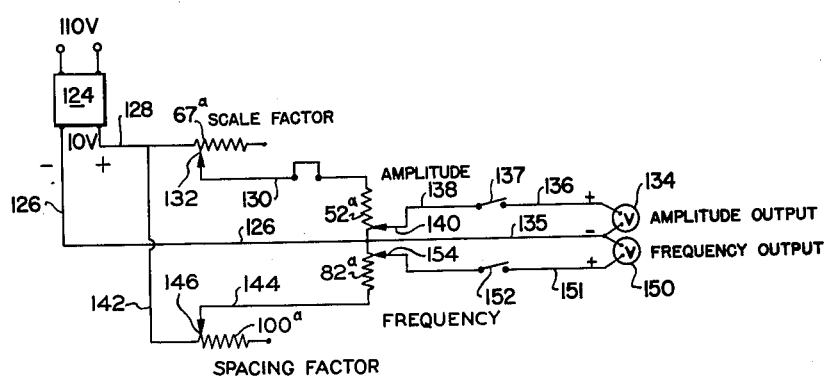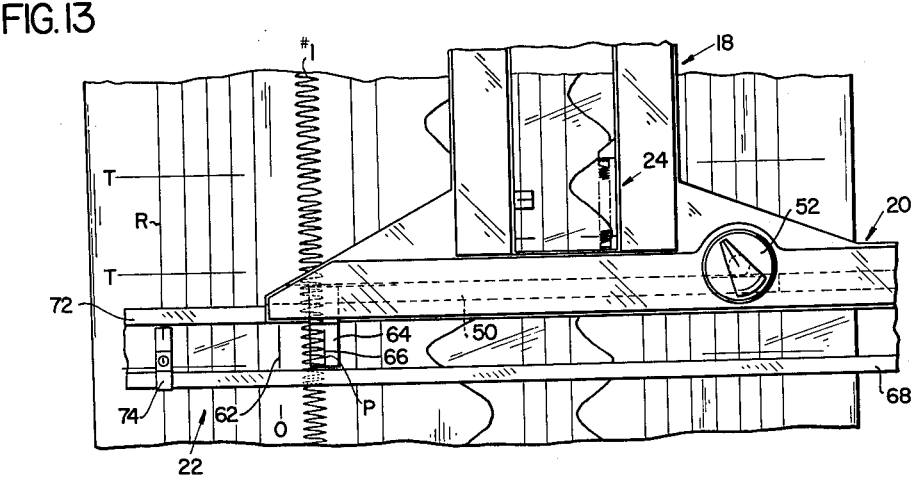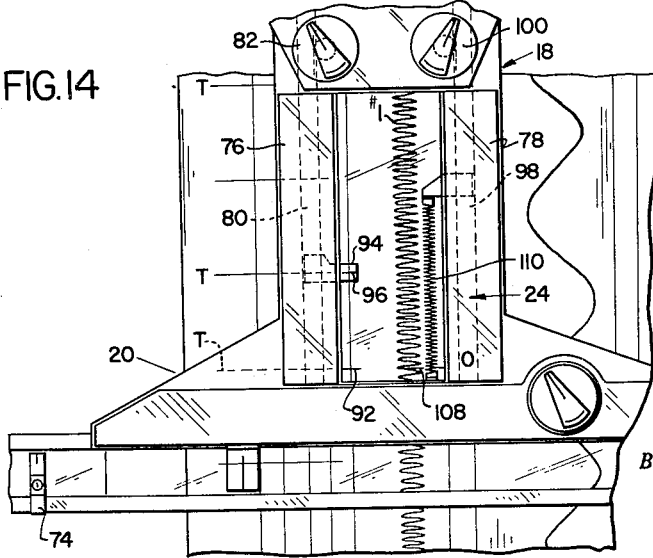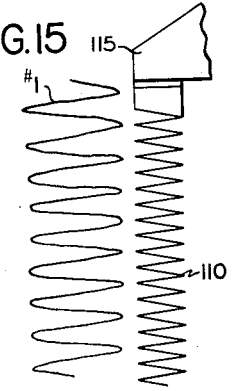

INVENTOR
HEINZ JOSEPH GERBER
BY Teller + McCormick
ATTORNEYS

United States Patent Office 3,089,243
Patented May 14, 1963

3,089,243
DATA READING APPARATUS
Heinz Joseph Gerber, Hartford, Conn., assignor to The Gerber Scientific Instrument Company, South Windsor, Conn., a corporation of Connecticut
Filed May 27, 1959, Ser. No. 816,299
5 Claims. (Cl. 33—1)

The invention relates to a data reading apparatus, and such an apparatus embodying the invention is primarily intended and adapted for conveniently and accurately reading the amplitudes and frequencies of one or more record traces on an oscillogram. The oscillogram or oscillogram sheet may have, and ordinarily does have, two or more generally parallel longitudinal traces each of which represents varying values recorded by an oscillograph. The values recorded by the respective traces may be of various kind, such as electrical characteristics or pressures or vibrations or the like. An apparatus embodying the invention includes a plate or body for supporting or holding an oscillogram or oscillogram sheet in a fixed position and includes a device or head which is above the plate or body and above an oscillogram sheet thereon and which has one or more instrumentalities for reading or measuring the oscillogram amplitudes or the frequencies or both.

The present invention relates more particularly to a data reading apparatus as set forth in and claimed in the copending Gerber application Serial No. 769,176 filed October 23, 1958 and entitled Data Reading Apparatus. Certain features of the presently disclosed construction are not herein claimed, but are claimed in said copending application.

One object of the invention is to provide a data reading apparatus of the above-identified type, wherein two instrumentalities are provided on one head for respectively measuring amplitude and frequency, said instrumentalities including electrical devices for indicating values and said instrumentalities having their several parts interrelated for simplicity of construction and convenience of use.

Another object of the invention is to provide an instrumentality alternative to that disclosed in said copending application and adapted for measuring amplitudes electrically rather than mechanically.

Another object of the invention is to provide electrical means which is adjustable in accordance with a known scale factor for the amplitudes of any particular trace and which enables the user to directly read the actual amplitude value for any selected point on said trace.

Another object of the invention is to provide an instrumentality alternative to that disclosed in said copending application and adapted for measuring frequencies, which instrumentality includes electrical means for compensating for variations in the spacing between timing lines.

Still other objects of the invention will be apparent from the drawings and from the following description.

The drawings show two embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a perspective view of a data reader embodying the invention.

FIG. 2 is a right side view.

FIG. 3 is a fragmentary sectional view taken along the line 3—3 of FIG. 2.

FIG. 4 is a plan view of an alternative mechanism having the same data reading head shown in FIG. 1, but having an alternative means for supporting the oscillogram sheet or strip.

FIG. 5 is an enlarged plan view of the reading head shown in FIGS. 1, 2 and 4.

FIG. 6 is an enlarged sectional view taken along the line 6—6 of FIG. 5.

FIG. 7 is an enlarged sectional view taken along the line 7—7 of FIG. 5.

FIG. 8 is an enlarged sectional view taken along the line 8—8 of FIG. 5.

FIG. 9 is an enlarged sectional view taken along the line 9—9 of FIG. 5.

FIG. 10 is an enlarged fragmentary perspective view taken in the direction of the arrow 10 in FIG. 5.

FIG. 11 is an enlarged fragmentary plan view of the extensible spring and adjacent parts.

FIG. 12 is a diagram of electrical connections.

FIG. 13 is a schematic view showing an oscillogram sheet with the reading head thereon, this view indicating the manner of use for reading the amplitude of a trace.

FIG. 14 is a schematic view similar to FIG. 13, but indicating the manner of use for reading the frequency of a trace.

FIG. 15 is an enlarged view of a portion of FIG. 14.

Figure 16:
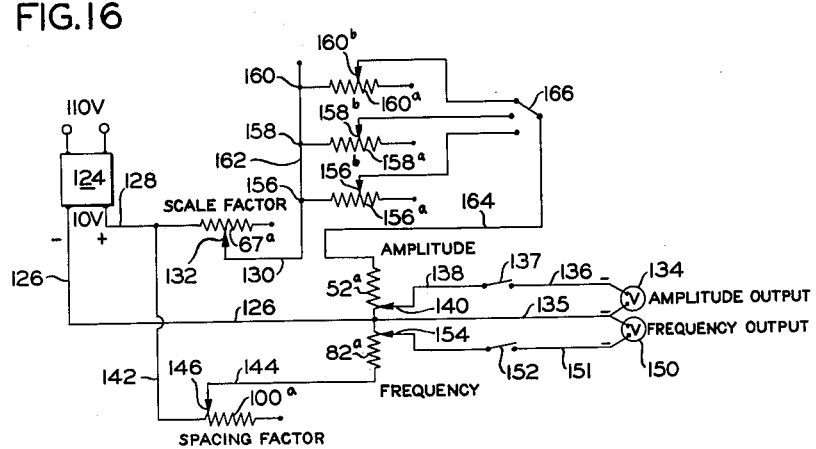
FIG. 16 is a wiring diagram generally similar to FIG. 12 but showing an alternative arrangement.

*Data Reader Shown in FIGS. 1 to 3*

Referring more particularly to FIGS. 1 to 3 of the drawings, an apparatus embodying the invention includes a main body 10 having an upper wall or plate 12 which is adapted to support an oscillogram strip A. The plate 12 has an upwardly exposed face which the strip A engages, and the strip is suitably held in fixed position in said face during readings.

As shown in FIGS. 1 to 2, the body 10 includes two side plates 14 and 16 which are rigidly connected with each other by suitable means not fully shown. The side plates 14 and 16 support the top plate 12, said side plates preferably being so formed that the top plate is inclined downwardly and forwardly.

A reading head, generally indicated at 18, is located on the body 10 above the plate 12 and above the strip A on said plate. The head 18 includes a frame 20 provided with an instrumentality 22 for reading the amplitudes of an oscillogram trace and an instrumentality 24 for reading the frequency of an oscillogram trace. These instrumentalities may be varied as to details, and two reading heads embodying the invention are hereinafter fully described. In general, each instrumentality 22 includes one element movable relatively to the frame 20 and having a portion registrable with a portion of the oscillogram and having associated electrical means for measuring the transverse distance from a known zero position; and each instrumentality 24 includes an element movable relatively to the frame 20 and having a portion registrable with successive cycles of the oscillogram and having associated electrical means for measuring the number of cycles per unit of longitudinal distance.

The strip A, when located on the plate 12, is not readily movable for fine adjustments, and a means is therefore provided for guiding the reading head 18 for bodily movement relatively to the body 10 and the plate 12 either transversely or longitudinally or both. As shown in FIGS. 1, 2 and 3, a transverse rod 26 is located at a normally fixed level above the plate 12. The rear portion of the frame 20 is apertured to receive and fit the rod 26. Thus the rod 26 supports the rear portion of the frame and guides said head 18 for transverse movement. The front portion of the frame rests directly upon the oscillogram sheet on the plate 12.

The rod 26 is rigidly connected at its left end with a member 32 which is guided for movement in a longitudinal direction parallel with the plate 12. As shown in FIGS. 2 and 3, a generally longitudinal rod 34 is provided which is in a fixed position parallel with the body face and which serves as a guide, this rod being preferably located within the body 10. The member 32 is connected with a rod 36 which extends into the body through a slot 38 in the body side plate 16. Thus the rod 34 supports the member 32 and the left end of the rod 26 and guides said parts for longitudinal movement in parallelism. Inasmuch as the head 18 is connected with said rod 26, said head is also guided for longitudinal movement in parallelism. Said head 18 together with the rod 26 and the member 32 are freely movable about the axis of the rod 34, such movement being upward from the position shown. The movement of said parts to a raised position facilitates the placement of an oscillogram strip A on the plate 12 and the removal of a strip therefrom. Downward movement of the rod 26 and the attached parts is limited by a button 40 at the free end of the rod 26, this button engaging the plate 12.

It will be seen that the rods 26 and 34 and the parts associated with them constitute parallel motion mechanism for guiding the reading head in its entirety for transverse and longitudinal bodily adjustments in parallelism with the exposed face of the body and relatively to an oscillogram sheet or strip located in fixed position on said face so as to properly position said head for effecting the desired reading.

*Strip Moving and Holding Mechanism Shown in FIGS. 1 and 2*

The oscillogram strip A is ordinarily quite long and it is preferably initially wound on a core B from which it is unwound as reading is effected. As the strip A is unwound from the core B, it is preferably wound upon another core C. Said cores are carried by spools 42 and 44.

The two spools 42 and 44 are the cores B and C thereon are preferably so held that they are rotatable about fixed transverse axes at the rear of the body 10. The strip A as it is unwound from the core B moves forwardly and downwardly and rearwardly around the body 10 and then to the core B on the spool 44.

An electric motor, not shown, is connected to the spools 42 and 44 for rotating them, and by electrical means controlled by a switch lever 46 on the body the spools may be rotated in either driection, so that the strip is wound onto the lower core C from the upper core B or is wound onto the upper core B from the lower core C. Thus any desired portion or zone of the strip A can be located on the plate 12. Said plate is preferably transparent and a lamp 48 within the body 10 illuminates the plate 12 and a strip A thereon.

The operating mechanism for the spools 42 and 4 is not a part of the present invention, said mechanism being disclosed and claimed in said copending application.

*Data Reader Shown in FIG. 4*

The present invention is not limited to a hollow body such as 10 or to spools such as 42 and 44 for unwinding and winding the strip. FIG. 4 shows an alternative embodiment of the invention wherein the head 18 is or may be as before described, but wherein the body may be a single plate 46 and wherein there are no spools such as 42 and 44 for unwinding and winding. The plate 46 is adapted to support a short strip A' or to support a portion of a longer strip. The strip A' may be held in place by pressure sensitive tape. The plate 46 corresponds in function to the plate 12.

As shown in FIG. 4, there is provided a transverse rod 48 similar to the rod 26, the head 18 being similarly connected to said rod. The rod 48 is rigidly connected at its left end to a member 50 guided for longitudinal movement along a rod 52 carried by the plate 46. The rods 48 and 52 and their associated parts function as previously described in connection with the rods 26 and 34. Additional description is unnecessary.

*Instrumentality for Measuring Amplitude—FIGS. 1 to 8 and 12*

The before-mentioned reading head 18 comprises the base member or frame 20 which normally rests upon an oscillogram sheet on the body plate 12. The head is so held by the described parallel motion means that it is adjustable either longitudinally or transversely, and it is so held that angular movement is prevented. The adjustability of the head enables the reading instrumentalities 22 and 24 to be located as required with respect to the oscillograms on the strip A.

Various electrical devices are mounted on or included in the head 18, these being hereinafter fully described. A flexible electrical cable 49 includes conductors supplying current for the said electrical devices.

The frame 20 has front and rear transverse edges 21 and 21a. The instrumentality 22 for measuring the amplitudes of any trace on the oscillogram strip A includes a first slide 50 which is guided on the frame 20 for transverse rectilinear movement relatively thereto. The slide 50 is adjacent one of the transverse edges 21 and 21a and it is shown as being adjacent the front edge 21. For moving the slide 50 the frame carries a manually operable potentiometer 52 having a downwardly extending shaft 54 as shown in FIG. 7. The shaft 54 has a pinion 56 thereon which meshes with rack teeth 58 on the slide 50.

Fixedly secured to the frame 20 is a transparent sheet 60 which preferably extends throughout the transverse length of the frame. The location of the sheet 60 is more clearly shown in FIG. 6. The sheet 60 has thereon a longitudinally extending hairline 62 which is registrable with a selected position on the oscillogram strip A. Said selected position may represent the zero or "0" position for any trace to be measured. Said hairline 62 is sometimes hereinafter referred to as a locating indicator. Fixedly secured to the slide 50 is a small transparent sheet 64 having a hairline 66 thereon registrable with a selected point on the oscillogram strip A. The last said selected point is ordinarily on the trace to be measured. Said hairline 66 is sometimes hereinafter referred to as a measuring indicator. By means of the potentiometer 52 the slide 50 can be transversely moved to transversely move the hairline 66 relatively to the hairline 62. The slide 50 can be regarded as being in zero position when the hairline 66 coincides with the hairline 62.

A potentiometer 67 is preferably mounted on the frame 20. Said potentiometer 67 has a manually rotatable outer body and it may include a digital indicator visible from above. The last said potentiometer is electrically connected with the potentiometer 52 as hereinafter explained in connection with the wiring diagram in FIG. 12.

A locating indicator supplemental to the locating indicator 62 is preferably provided on the frame 20 of the reading head, this supplemental indicator being transversely adjustable relatively to the frame. For carrying the supplemental indicator there is provided a straight transverse bar 68 which is secured to the frame preferably at the front edge thereof. The bar 68 is spaced from the frame and it projects to a substantial extent toward the left. Preferably the bar is connected at its right end to a forward extension 70 on the frame 20. The left end portion of the bar 68 is bent to a U-shape, the rearward leg 72 of the U being attached directly to the frame. Carried by the bar 68 and adjustable therealong is at least one indicator tab 74, and preferably there is a plurality of such tabs. The tabs have locating marks at their rearward ends which marks constitute the supplemental locating indicators. The tabs 74, 74 are preferably detachable and are snapped into place on the bar 68 as required, and said tabs are suitably numbered.

Referring to the wiring diagram in FIG. 12, 124 is a voltage regulator of known type which may be located in a box separate from the reading head. This voltage regulator delivers current at an accurately fixed predetermined voltage differential to leads 126, 128 included in the cable 49. This fixed voltage may be 10. The lead 128 has the greater potential, and said leads 128 and 126 are hereinafter sometimes referred to respectively as the high and low voltage leads. The resistance 52ª of the potentiometer 52 is connected with the low voltage lead 126, and the resistance 67ª of the potentiometer 67 is connected with the high voltage lead 128. A conductor 130 connects the potentiometer resistances 52ª and 67ª, said conductor 130 being connected with the resistance 67ª by means of an adjustable contact 132 so that the voltage is varied in accordance with the adjustment of said contact. A voltmeter 134, or other suitable instrument, is connected by means of conductors 135 and 136 in the cable 49 with the low voltage lead 126 and with a normally open switch 137 on the head. Said switch 137 is connected with the resistance 52ª of said potentiometer 52 by means of a conductor 138 and an adjustable contact 140 so that the predetermined voltage between the leads 128 and 126 is divided in accordance with the adjustment. The voltmeter 134 is preferably calibrated to indicate volts. The contact 132 is shown in its extreme right position and the contact 140 is shown at its extreme lower position.

With the contact 140 in its extreme lower position, as viewed in FIG. 12, said contact is at the position of zero voltage, and the voltage at said voltmeter would be at zero. The last said position of the contact 140 corresponds to the before-defined zero position of the slide 50. The voltmeter is calibrated to read "0" with the contacts in the positions shown.

*Amplitude Measuring Procedure—FIGS. 12 and 13*

FIG. 13 shows a representative oscillogram having several longitudinal traces. In the explanations that follow, references will be made primarily only to the trace marked "#1." The oscillogram has one or more longitudinal reference lines, but only the line R at the left will be considered. The oscillogram further has uniformly spaced transverse lines T, T which represent time. Usually the spacing between each two adjacent lines represents one second or 1/10 second.

FIG. 13 also schematically shows the reading head located on the described oscillogram, and it will be understood that trace #1 is to be read or measured. It will be assumed that trace #1 is of the linear type, that is, that values as represented by various points on the trace vary in direct proportion to the spacing of the points from a zero or "0" position. The "0" position for trace #1 is either marked on the strip or has a known spacing from the reference line R. The scale factor of trace #1 is known, and as an example, it may be assumed that an amplitude of 1″ on the trace represents 24,700 p.s.i.

Before measuring amplitudes, the apparatus is calibrated for a selected scale factor. In the example given, the scale factor is: 1″=24,700 p.s.i. In calibration, the slide 50 is moved toward the right by means of the potentiometer 52 so that the line 66 is spaced 1″ from the line 62. As the potentiometer 52 is turned to so move the slide 50, the contact 140 is proportionately moved upwardly along the resistance 52ª, this resistance constituting a voltage divider. As the result of the last said movement, the voltage at the voltmeter 134 is increased above the initial zero voltage until said voltage is in excess of 2.47 which would correspond to the selected scale factor of 24,700. Then the potentiometer 67 is turned to move the contact 132 along its resistance 67ª toward the right to increase the resistance in the circuit for the voltmeter 134. As the result of the increased resistance, the voltage at the voltmeter 134 is decreased. The last mentioned adjustment of the potentiometer 67 is continued until the voltmeter has the required scale factor reading which is 2.47. The potentiometer 67 is not further adjusted for the selected trace, but the potentiometer 52 is adjusted to move the slide 50 and the line 66 for reading the amplitude at particular points on the trace. It will be seen that the resistance 67ª of the potentiometer 67 constitutes a compensating resistance which is connected in circuit with said first resistance 52ª and with said amplitude voltmeter or indicating device 134 and which is manually adjustable so as to vary the voltage at said indicating device in accordance with said scale factor so that the values indicated by said means vary in accordance with said scale factor.

The compensating potentiometer 67 may have an indicator for indicating the setting thereof and, after said potentiometer has been adjusted as above stated, a notation is made of the indicator reading for the particular trace, in the example this being #1. Preferably and as shown, the indicator is digital in character. After adjustments have been made to read other traces, the trace #1 adjustment can be easily restored by returning the compensating potentiometer 67 to the same indicator reading.

After calibrating and setting as above described, the first actual reading step is to adjust the head transversely so that the "0" mark 62 on the indicator 60 registers with the "0" position for the trace to be measured. Then the potentiometer 52 and the slide 50 are adjusted so that the line 66 registers with a point such as P. The voltage at the voltmeter 134 varies proportionately to the last said adjustment, and the voltmeter will then indicate the amplitude value at the point P in pounds per square inch, due consideration being given to the decimal point. The switch 139 is normally open and it is closed by the push button on the head when a reading is to be taken on the voltmeter. The procedure is repeated for reading the amplitude value of other points on the trace.

Preferably and as a part of the initial adjustment for any trace, such as trace #1, the location tab 74 which bears the number "1" is snapped onto the carrier bar 68 and is registered with the longitudinal reference line R, when the "0" line 62 is in register with the "0" position for the particular channel. When a subsequent reading is to be made for channel #1, either after transverse movement of the head to read the amplitudes of other traces or to read the frequency of the same trace or after longitudinal movement of the head or of the strip to read the amplitudes of other portions of the same trace, the registry of the tab marked "1" with the reference line R insures the same spacing of the "0" position from said reference line. It will be understood that different tabs 74 are used in connection with different traces. For each trace, the corresponding tab enables the head to be restored to the proper transverse position.

The provision of an adjustable locator tab 74 is very important even when only a single trace is to be read. With a long strip A, such as shown in FIG. 1, there may be transverse shifting of portions of the strip during unwinding and winding. The reference line R may not be always exactly longitudinal and it may "wander" when the oscillogram strip is moved to a new position. This shifting of the strip and of the reference line may result from different causes such as inaccurate initial winding on the core B, or incorrect location of the cores B and C on their spools, or uneven stretching of the strip under tension. Whatever the cause of the shifting, it is of no importance when a locator tab 74 is provided and used.

The reading head is accurately located with respect to the longitudinal reference line R irrespective of the transverse position of the strip.

Instrumentality for Measuring Frequency— FIGS. 1 to 5 and 8 to 12

The frame 20 includes two portions 76 and 78 which extend longitudinally and are transversely spaced. Secured to the frame portions 76 and 78 at the bottoms thereof is a sheet 90 of transparent material, which sheet is positioned to engage the surface of the oscillogram sheet. The instrumentality 24 for measuring the frequency of any trace, includes a slide 98 carried by the right frame portion 78 and guided for longitudinal movement relatively thereto, the slide being adjacent the left or inner edge of said frame portion. For moving the slide 98 said frame carries a manually operable potentiometer 100 having a downwardly extending shaft 102 as shown in FIG. 9. The shaft 102 has a pinion 104 thereon which meshes with rack teeth 106 on the slide 98.

A longitudinal extensible coil spring 110 is connected at its forward end with a member 112 in fixed position on the main portion 21 of the frame 20 and is connected at its rearward end with a member 115 on the slide 98. When the slide 98 is moved, the length of the spring 110 is increased or decreased. The spring 110 has its convolutions uniformly spaced, the spacings between all of the convolutions being uniformly varied when the length of the spring is increased or decreased. The spring convolutions are preferably generally triangular in shape.

Referring particularly to FIG. 10, the spring 110 is preferably so located that the straight or substantially straight portions 116, 116 of the convolutions are parallel with and in close proximity to the top of the sheet 90. The convolutions are relatively sharply bent and the spring therefore has longitudinally aligned relatively sharp corner portions 118, 118 which are at the bottom thereof. These corner portions 118, 118 are at the left as viewed in FIG. 5 and at the right as viewed in FIG. 10. Said corner portions constitute graduations, particularly in conjunction with the adjacent inclined convolution portions 120, 120. By means of the potentiometer 100 the slide 98 can be longitudinally moved to increase or decrease the length of the spring 110. The spring 110 preferably has 40 effective convolutions and it has a minimum length of 0.4" and a maximum length of 4.0". At the minimum length there are 100 coils per inch and at the maximum length there are 10 coils per inch. A line 108 is provided on the sheet 90 which is in register with the zero coil of the spring 110.

In the use of the graduation spring 110, it is desirable for the user to be able to readily select or identify the several graduations, regardless of the amount of spring extension. The graduations may be at least partially identified by colored markings 122 and FIG. 11 shows one pattern of suitable markings. For clarity, only the colored markings are shown and the unmarked portions of the spring convolutions are omitted. The "0" graduation and all graduations that are multiples of 10 have the same color markings which may be red. All intermediate graduations which are multiples of 5 have another color which may be blue. All other graduations have another color marking which may be white. Preferably the intermediate graduations which are not multiples of 10 or 5 have shorter markings for increased convenience of reading.

The instrumentality 24 also includes a second slide 80 which is carried by the left frame portion 76 and which is guided for longitudinal movement relatively thereto, the slide being adjacent the right or inner edge of said frame portion. For moving the slide 80 said frame carries a manually operable potentiometer 82 having a downwardly extending shaft 84 as shown in FIG. 9. The shaft 84 has a pinion 86 thereon which meshes with rack teeth 88 on the slide 80. The sheet 90 has a horizontal mark or hairline 92 located in the lower left portion thereof and near the frame portion 76. This hairline 92 is in transverse register with the line 108 and it is registrable with a selected point on an oscillogram strip A. Fixedly secured to the slide 80 and located very close to the sheet 90 is a transparent indicator 94 having a transverse mark or hairline 96 thereon, this hairline being also registrable with a selected point on an oscillogram strip A. By means of the potentiometer 82 the slide 80 can be longitudinally moved to longitudinally move the hairline 96 relatively to the fixed hairline 92. The resistance of the potentiometer 82 constitutes a compensating resistance as hereinafter explained. The slide 80 can be regarded as being in zero position when the hairline 96 coincides with the hairline 92.

As best shown in FIG. 8, a transparent cover sheet 121 extends over the space between the frame portions 76 and 78. This sheet protects the enclosed parts and excludes dust.

Referring further to the wiring diagram in FIG. 12, the resistance 82$^a$ of the potentiometer 82 is connected with the lead 126, and the resistance 100$^a$ of the potentiometer 100 is connected with the lead 128 through a conductor 142. A conductor 144 connects the potentiometer resistances 82$^a$ and 100$^a$, said conductor 144 being connected with the resistance 100$^a$ of said potentiometer 100 by means of an adjustable contact 146 so that the voltage is varied in accordance with the adjustment of said contact. A voltmeter 150, or other suitable instrument, is connected by means of said conductor 135 and another conductor 151 in the cable 49 with the lead 126 and with a normally open switch 152 on the head. Said switch 152 is connected with the resistance 80$^a$ of said potentiometer 82 by means of a conductor 153 and an adjustable contact 154 so that the voltage is divided in accordance with the adjustment. The contact 146 is shown in its extreme right position and the contact 154 at its extreme upper position.

With the contact 154 in its extreme upper position, as viewed in FIG. 12, said contact is at the position of zero voltage and the voltage of said frequency voltmeter 150 would be at a zero. The last said position of the contact 154 corresponds to the position of the slide 80 when line 94 on the slide 80 registers with the line 92 on the sheet 90.

Frequency Measuring Procedure—FIGS. 12, 14 and 15

For use in determining spacing or frequency, the reading head is adjusted longitudinally, and transversely if necessary, to bring the line 92 on the sheet 90 into register with one of the transverse timing lines T. Then the potentiometer 82 is turned to move the second slide 80 so as to bring the line 94 into register with the next adjacent timing line T. The contact 154 is correspondingly moved downwardly along the resistance 82$^a$ of said potentiometer 82. Thus the resistance 82$^a$ is adjusted proportionately to the movement of the slide 80 and the voltage at the voltmeter 150 is increased to an extent correspondingly to the spacing of the timing lines T, T.

Then the reading head is adjusted longitudinally and transversely so that line 108 and the "0" coil of the spring 110 are in register with one peak or pip of a trace cycle. The line 108 on the sheet 90 is useful for making certain that the zero coil of the spring is in exact register with the peak or pip, as exemplified in FIG. 14. Thereafter potentiometer 100 is turned to move the first slide 98 so as to adjust the length of the spring and to enable uniformly spaced spring coils to register exactly, or as closely as possible, with the other peaks or pips of the trace cycles. As shown more clearly in FIG. 15, every second coil is in register with a peak or cycle. As the spring 110 is adjusted in length, the contact 146 is correspondingly moved toward the right along the resistance 100$^a$ of said potentiometer 100. The voltage resulting from the combined action of the compensation potentiometer 82 and of the potentiometer 100 is read on the voltmeter 150. The switch 152 is normally open and it is closed by the push button on the head when a reading on the voltmeter 150 is to be taken.

The voltmeter is calibrated to read directly in frequency, that is, in the number of oscillations per unit of length as represented by the spacing between the lines T, T. If the lines T T, were exactly 1" apart and if the spring 110 were at minimum length with each coil registered with a peak, the voltmeter calibration would be "100," to indicate a frequency of 100.

When the slide 80 and the line 94 are moved upwardly for a larger time line spacing, without adjusting the slide 98 and the spring 110, the contact 154 is moved downwardly along the resistance 82 and to thus increase the voltage at said voltmeter 150. The voltmeter thus indicates an increased frequency per unit of length. When the slide 98 is moved upwardly in accordance with a greater spacing between spring coils, without adjusting the slide 80, the contact 146 is moved toward the right to include additional resistance at 10 and to thus decrease the voltage at the voltmeter 150. The voltmeter thus indicates a decreased frequency per unit of length.

In the example illustrated in FIG. 15, every second coil of the spring 110 registers with a peak and therefore the voltmeter reading must be divided by two to determine the actual frequency.

*Alternative Use of Reading Head*

Instead of reading amplitude and frequency as described, the potentiometer 52 and the slide 50 together with the potentiometer 82 and the slide 80 may be used for measuring the $x$ and $y$ values on a graph.

By means of the potentiometer 67 adjustment may be made so that the extents of movement of the slide 50 for measuring $y$ values corresponds with the transverse scale of the graph, readings being taken directly from the voltmeter 134. By means of the potentiometer 100 adjustment may be made so that the extents of movement of the slide 80 for measuring $x$ values corresponds to the longitudinal scale of the graph, readings being taken directly from the voltmeter 150.

*Alternative Arrangement for Measuring Amplitude— FIG. 16*

When it is necessary to read a plurality of oscillogram sheets having generally similar traces, additional scale factor potentiometers may be provided as shown in FIG. 16.

As illustrated, there are three additional potentiometers 156, 158 and 160, which are similar to the potentiometer 67, but which do not have digital indicators. These potentiometers are provided respectively with resistances 156a, 158a and 160a. By means of conductors 162 and 164 the several resistances are connectible in parallel with each other and between the resistances 67a and 52a. The potentiometers 156, 158 and 160 include adjustable contacts 156b, 158b and 160b which are connected with a selector switch 166 interposed between said contacts and the conductor 164.

When the oscillogram sheets to be read have three traces, the potentiometer 67 provides a master compensating resistance having an over-all scale factor and the potentiometers 156, 158 and 160 are adjusted for the scale factors of the respective traces. By means of the selector switch 166 the potentiometer 156, 158 or 160 for any selected trace can be connected in the circuit when said trace is to be read.

Figure 17:
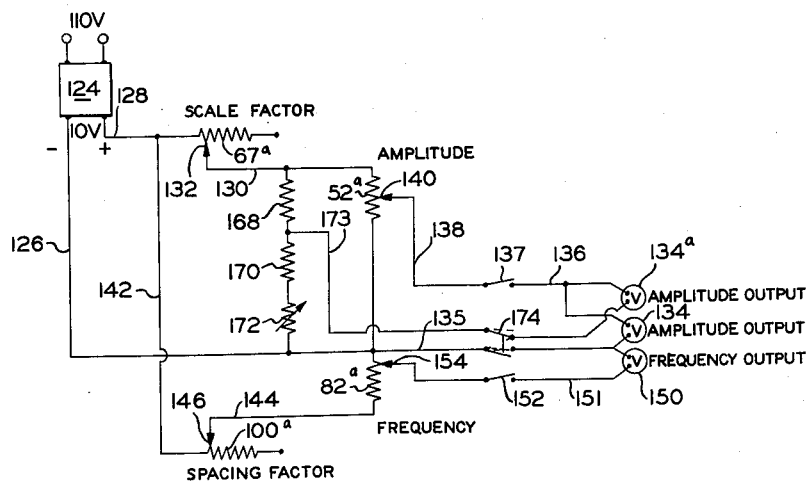
FIG. 17 is a wiring diagram generally similar to FIG. 12 but showing a second alternative arrangement.

*Second Alternative Arrangement for Measuring Amplitude—FIG. 17*

In some instances, the zero line for a trace is not below or at one side thereof as shown in FIG. 13, but is located about midway thereof so that positive and negative amplitude measurements must be made. The arrangement shown in FIG. 17 is adapted for plus and minus measurements.

FIG. 17 is in most respects similar to FIG. 12 and the following description relates only to those portions that are different.

Connected in series between the conductors 130 and 126 are two equal or approximately equal resistances 168 and 170, and a conductor 173 is connected between the resistances. This conductor is connected with a voltmeter 134a which is similar to the voltmeter 134 but adapted to read plus and minus values. The resistance 168 may be somewhat greater than the resistance 170 and a trim resistance 172 may be provided which may be adjusted so that the total resistances are exactly equal at the sides of the conductor 173. The voltage in the conductor 173 is exactly half of the total voltage, and when the total voltage is 10 the voltage in the conductor 173 is 5.

Also connected between the conductors 130 and 126 is the resistance 52a of the potentiometer 52 and the adjustable contact 140 is initially at the midpoint of the resistance 52a. When the contact 140 is at the midpoint position, the voltage in the conductor 138 is one-half of the total voltage, that is, 5 volts. From the foregoing description it will be apparent that, with the switch 137 closed, the voltages in the two connections with the voltmeter are exactly equal and the voltmeter indicates zero.

In measuring amplitude, the head is moved transversely so that the measuring indicator or line 66 on the slide 50 is in register with the zero line located midway of the trace amplitude. With the contact 140 at its illustrated mid-position, the reading on the voltmeter 134a is zero. When the contact 140 is moved upwardly in accordance with a movement of the slide 50 toward the right, the voltage at the voltmeter 134a is increased and the voltmeter indicates a positive amplitude measurement. When the contact 140 is moved downwardly in accordance with a movement of the slide 50 toward the left, the voltage at the voltmeter 134a is decreased and the voltmeter indicates a negative amplitude measurement.

A selector switch 174 is provided between the conductor 173 and the voltmeter 134a. When this switch is in the position shown, the conductor 173 is connected and plus or minus readings may be taken as described at said voltmeter 134a. When the switch 174 is moved to the dotted line position, the conductor 135 is connected with the voltmeter 134 and readings may be taken as described in connection with FIG. 12.

The invention claimed is:

1. A data reader for use with an oscillogram sheet having a generally longitudinal trace thereon and having a longitudinal reference line thereon in predetermined transversely spaced relationship to a zero position for said trace which data reader comprises in combination, a frame adapted to be located above such an oscillogram sheet, a locating indicator in fixed relationship with the frame and adapted upon transverse adjustment of the frame to register with a known zero position for the oscillogram trace, a slide guided for transverse rectilinear movement relatively to the frame, a measuring indicator connected to said slide and having a longitudinal hairline thereon, manually operable means for moving the slide transversely to bring said measuring indicator into register with a selected point on said trace while said locating indicator remains at said zero position, an electric circuit including a variable resistance constituting a voltage divider, means connected with said resistance for varying it to change the voltage proportionately to the extent of movement of said slide and of said movable indicator, an electrical indicating device connected in circuit with said resistance and responsive to voltage changes resulting from resistance variations which device serves to indicate the amplitude values represented by the distance from said zero position to said selected point on said trace, and a supplemental locating indicator on the frame which is additional to the first said locating indicator and which is transversely adjustable relatively to the frame, said supplemental locating indicator being registrable with said longitudinal reference line to facilitate the subsequent relocation of said head with the first said locating indicator in register with said zero position.

2. A data reader for use with an oscillogram sheet having a generally longitudinal trace thereon which trace has positive and negative amplitude values with respect to a known zero line, said data reader comprising in combination, a main body having an upwardly exposed flat face adapted to support a sheet such as aforesaid, a frame on the body above said exposed flat face and above a sheet thereon, a parallel motion mechanism for guiding said frame for longitudinal and transverse bodily adjustments parallelly with said exposed face and relatively to an oscillogram sheet thereon, a slide guided for rectilinear transverse movement relatively to the frame, a measuring indicator connected to said slide for movement therewith which indicator is movable to a zero position at said zero line of the trace, manually operable means for moving the slide to bring said measuring indicator into register with a selected point on said trace which point may be at a positive distance or at a negative distance from said zero position, an electric circuit including a low voltage lead and a high voltage lead, means for maintaining a predetermined voltage differential between said leads, two equal resistances connected in series between said leads, a third resistance connected between said leads and in parallel with said equal resistances, a tap engageable with said third resistance and movable therealong in unison with movement of said slide, said tap engaging said third resistance at a midway zero position when said measuring indicator is at its said zero position, and an electrical indicating device connected between conductors respectively connected with a point between said equal resistances and with said movable tap which device has a zero reading when said measuring indicator and said tap are at their zero positions and which device serves to indicate the positive or negative amplitude values represented by the positive or negative distances of said measuring indicator from its said zero position.

3. A data reader for use with an oscillogram sheet having a generally longitudinal trace thereon which trace has positive and negative amplitude values with respect to a known zero line, said data reader comprising in combination, a main body having an upwardly exposed flat face adapted to support a sheet such as aforesaid, a frame on the body above said exposed flat face and above a sheet thereon, a parallel motion mechanism for guiding said frame for longitudinal and transverse bodily adjustments parallelly with said exposed face and relatively to an oscillogram sheet thereon, a slide guided for rectilinear transverse movement relative to the frame, a measuring indicator connected to said slide for movement therewith which indicator is movable to a zero position at said zero line of the trace, manually operable means for moving the slide to bring said measuring indicator into register with a selected point on said trace which point may be at a positive distance or at a negative distance from said zero position, an electric circuit including a low voltage lead and a high voltage lead, means for maintaining a predetermined voltage differential between said leads, two equal resistances connected in series between said leads, a third resistance connected between said leads and in parallel with said equal resistances, a tap engageable with said third resistance and movable therealong in unison with movement of said slide, said tap engaging said third resistance at a midway zero position when said measuring indicator is at its said zero position, an electrical indicating device connected between conductors respectively connected with a point between said equal resistances and with said movable tap which device has a zero reading when said measuring indicator and said tap are at their zero positions and which device serves to indicate the positive or negative amplitude values represented by the positive or negative distances of said measuring indicator from its said zero position, and a compensating resistance connected in series with the said equal resistances and with said third resistance which last said resistance is manually adjustable so as to vary the voltage at said indicating device in accordance with the scale factor so that the values indicated by said device vary in accordance with said scale factor.

4. A data reader head for use with an oscillogram sheet held in a fixed position and having a generally longitudinal trace thereon with approximately uniformly spaced cycles, said head comprising in combination, a frame adapted to be located above such an oscillogram sheet, a longitudinally adjustable slide on the frame, a movable device connected with said slide and having a plurality of portions which upon adjustment of the slide are respectively registrable with successive cycles of said oscillogram trace, an electric circuit including a variable resistance constituting a voltage divider, means connected with said resistance for varying it proportionately to the extent of movement of said slide and of said movable device, an electrical indicating device connected in circuit with said resistance and responsive to voltage changes resulting from resistance variations which indicating device is calibrated to indicate the number of cycles per unit of length when the portions of said movable device are registered with said cycles, a second longitudinally adjustable slide on the frame, stationary and movable indicators respectively on the frame and on the second slide which indicators upon adjustment of the second slide may be longitudinally spaced by a distance equal to a prescribed unit of length, a resistance connected in circuit with the first resistance and with said indicating device, and means connected with said second resistance for varying it proportionately to the extent of movement of the second slide so that the number indicated by said indicating device is related to the prescribed unit of length.

5. A data reader for use with an oscillogram sheet having a generally longitudinal trace thereon, said data reader comprising in combination, a main body having an upwardly exposed flat face adapted to support a sheet such as aforesaid, a frame on the body above said exposed flat face and above a sheet thereon, a parallel motion mechanism for guiding said frame for longitudinal and transverse bodily adjustments parallelly with said exposed face and relative to an oscillogram sheet thereon, an upwardly exposed first transparent sheet connected to said frame in close proximity to said flat face of said body and having a first longitudinal hairline thereon adapted upon transverse adjustment of the frame to register with a known zero position for the oscillogram trace, a slide guided for rectilinear transverse movement relatively to the frame, a second upwardly exposed transparent sheet fixedly connected to said slide immediately above said first transparent sheet and having a second longitudinal hairline thereon which latter hairline is movable to zero position in register with said first hairline, manually operable means for moving the slide to bring said second hairline into register with said first hairline, manually operable means for moving the slide to bring said second hairline into register with a selected point on said trace while said first hairline remains at said zero position, an electric circuit including a variable resistance constituting a voltage divider, means connected with said resistance for varying it to change the voltage proportionately to the distance between said second hairline and the zero position thereof represented by said first hairline, and an electrical indicating device connected in circuit with said resistance and responsive to voltage changes resulting from resistance variations which device serves to indicate the amplitude values represented by the distance from said zero position to said selected point on said trace.

(References on following page)

References Cited in the file of this patent

UNITED STATES PATENTS

| | | |
|---|---|---|
| 2,215,148 | Ehrler et al. | Sept. 17, 1940 |
| 2,403,633 | Browning | July 9, 1946 |
| 2,469,129 | Reimann | May 3, 1949 |
| 2,549,634 | Parsons | Apr. 17, 1951 |
| 2,614,327 | Russell | Oct. 21, 1952 |
| 2,636,383 | More et al. | Apr. 28, 1953 |
| 2,824,376 | Yarrow | Feb. 25, 1958 |
| 2,843,935 | Gerber | July 22, 1958 |

OTHER REFERENCES

Publication, the "Gerber Graphanalogue and Variable Scale," Gerber Scientific Inst. Co., Hartford, Conn. Received in Patent Office May 2, 1956, copy in 33-107.